United States Patent
Lodge et al.

(10) Patent No.: US 11,761,910 B2
(45) Date of Patent: Sep. 19, 2023

(54) SURFACE OR INTERFACE DEFECT DETECTION

(71) Applicant: ROLLS-ROYCE plc, London (GB)

(72) Inventors: Andrew J Lodge, Derby (GB); Akhil Mulloth, Derby (GB)

(73) Assignee: ROLLS-ROYCE plc, London (GB)

( * ) Notice: Subject to any disclaimer, the term of this patent is extended or adjusted under 35 U.S.C. 154(b) by 1202 days.

(21) Appl. No.: 16/270,152

(22) Filed: Feb. 7, 2019

(65) Prior Publication Data

US 2019/0277778 A1    Sep. 12, 2019

(30) Foreign Application Priority Data

Mar. 6, 2018 (IN) .............................. 201811008212
Apr. 23, 2018 (GB) ..................................... 1806540

(51) Int. Cl.
*G06T 7/00* (2017.01)
*G01N 23/046* (2018.01)
*G06T 17/00* (2006.01)

(52) U.S. Cl.
CPC ......... *G01N 23/046* (2013.01); *G06T 7/0002* (2013.01); *G06T 7/0004* (2013.01); *G01N 2223/63* (2013.01); *G01N 2223/646* (2013.01); *G06T 17/00* (2013.01); *G06T 2207/10081* (2013.01); *G06T 2207/10116* (2013.01)

(58) Field of Classification Search
CPC ........... G06T 17/00; G06T 2207/10081; G06T 7/0004; G06T 2207/10116
See application file for complete search history.

(56) References Cited

U.S. PATENT DOCUMENTS

| | | | |
|---|---|---|---|
| 3,995,164 A * | 11/1976 | Ramsay ............... | G01N 23/083 378/53 |
| 6,829,327 B1 * | 12/2004 | Chen ..................... | G01N 23/223 378/82 |
| 7,202,475 B1 * | 4/2007 | Testoni .............. | G01N 23/2252 250/307 |
| 2001/0009182 A1 * | 7/2001 | Naik ........................ | B22C 1/00 264/220 |

(Continued)

FOREIGN PATENT DOCUMENTS

| | | |
|---|---|---|
| CN | 104 142 381 A | 11/2014 |
| EP | 0875751 A1 | 11/1998 |

(Continued)

OTHER PUBLICATIONS

Oct. 22, 2018 Search Report issued in British Patent Application No. GB1806540.9.

(Continued)

*Primary Examiner* — Phi Hoang
(74) *Attorney, Agent, or Firm* — Oliff PLC

(57) ABSTRACT

A method of detecting defects on a surface or interface of a part is provided. The method includes: providing data from an X-ray scan of the part; processing the scan data to obtain an original 3D or 2D model of a surface or interface topology of the part; and filtering the original 3D or 2D model of the surface or interface topology to identify deviations from the expected surface or interface topology of the part. The identified deviations may be produced by surface or interface defects on the part.

14 Claims, 4 Drawing Sheets

(56) References Cited

U.S. PATENT DOCUMENTS

| | | | | |
|---|---|---|---|---|
| 2005/0280185 | A1* | 12/2005 | Russell | B29C 64/165 |
| | | | | 425/375 |
| 2007/0058777 | A1* | 3/2007 | Kondo | G01N 23/04 |
| | | | | 378/57 |
| 2012/0033787 | A1* | 2/2012 | Schreiber | G01N 23/04 |
| | | | | 378/58 |
| 2014/0129184 | A1* | 5/2014 | Mehrabi | G06F 30/00 |
| | | | | 703/1 |
| 2017/0178308 | A1* | 6/2017 | Subramaniyan | G06V 10/76 |
| 2017/0292922 | A1* | 10/2017 | Woods | B22F 10/38 |
| 2017/0330314 | A1* | 11/2017 | Stu | G06T 5/50 |
| 2018/0164470 | A1* | 6/2018 | Honarpour | G01V 5/04 |
| 2018/0208847 | A1* | 7/2018 | White | G02F 1/133711 |

FOREIGN PATENT DOCUMENTS

| | | |
|---|---|---|
| EP | 0905509 A1 | 3/1999 |
| EP | 2226609 A2 | 9/2010 |
| WO | 2018/014138 A1 | 1/2018 |

OTHER PUBLICATIONS

Jul. 4, 2019 Search Report issued in European Patent Application No. 19155767.7.

* cited by examiner

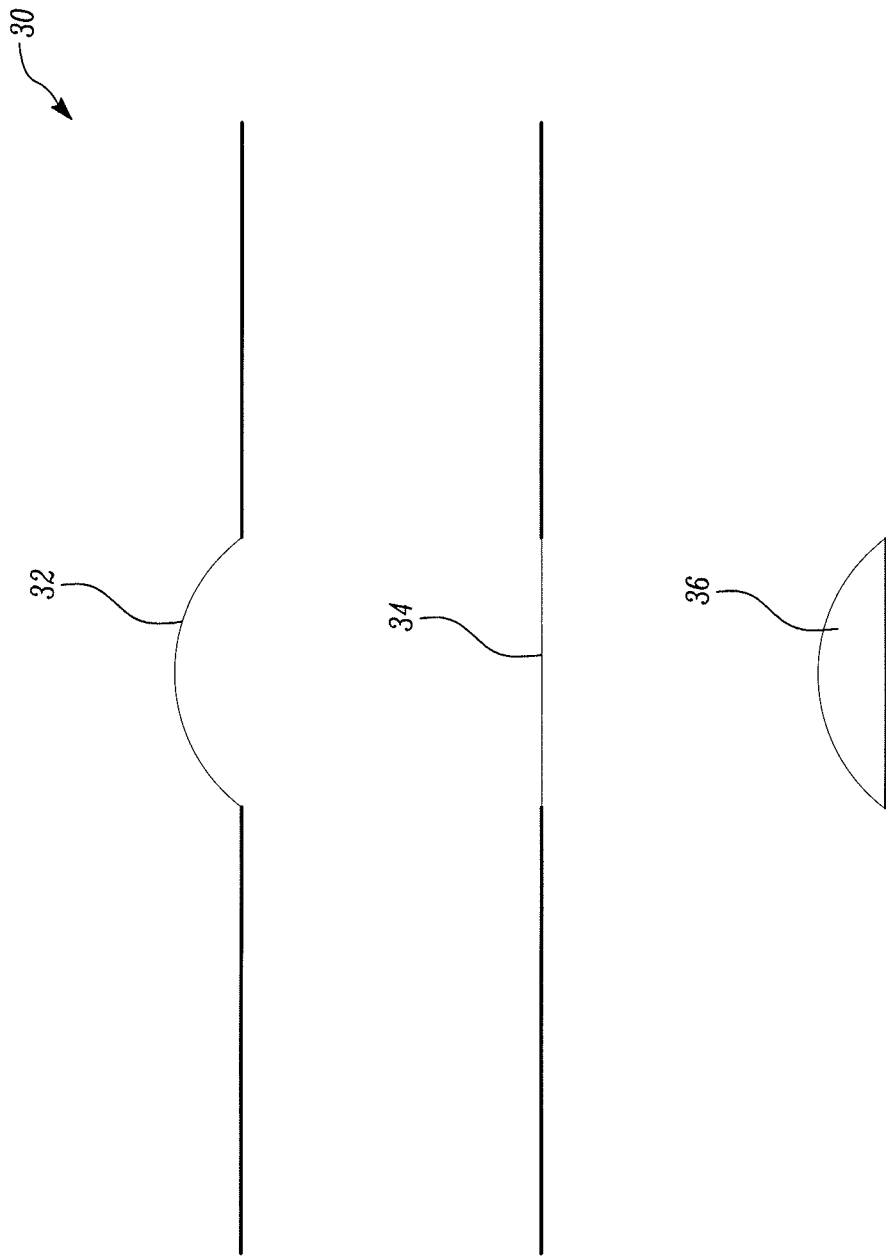

SURFACE OR INTERFACE DEFECT DETECTION

FIELD OF THE INVENTION

The present invention relates to detection of defects on a surface or interface of a part.

BACKGROUND

Investment casting involves the production of a metal casting using a ceramic shell mould, which is in turn produced using an expendable pattern of the component to be cast. In order that the metal casting may be formed with internal details, a ceramic core can be located in the shell mould prior to casting, e.g. by embedding the core in the expendable pattern. In the context of gas turbine engines, investment casting is typically used to produce turbine blades, with complex and delicate ceramic cores being used to give the blades intricate internal cooling geometries. FIG. 1 shows a section through a high-pressure turbine blade 10 having a complex internal cooling geometry, and FIG. 2A shows a ceramic core 12 that provides the complex internal cooling geometry of a high-pressure turbine blade, and FIG. 2B shows four joined ceramic shells 14 for respective high-pressure turbine blades ready to go to casting and with the ceramic cores already inside each shell.

Such ceramic cores may conveniently be manufactured from a mixture of a ceramic powder and a plasticising binder powder which gives the mixture green strength and plasticity so that it can be formed into and hold the required shape. The shaped green structure is then fired, which burns off the binder and sinters the ceramic powder into the final ceramic core.

Typically, the green structure is placed in a container with a surrounding firing medium in readiness for the firing operation. The firing medium is another ceramic powder that provides support to the shaped core to cope with the heating process which is to follow.

After firing, the firing medium can be cleaned off the ceramic core using a number of different approaches. However, none of these cleaning approaches is perfect, and therefore some firing medium powder may still be found on the surface of the ceramic core. This is undesirable as it may cause contamination of and/or defects in the blade which is ultimately cast around the core.

Therefore, the ceramic cores are manually inspected under a microscope before being used for casting, and are cleaned up if residual firing medium powder is found on the surface of a core. This manual inspection is time consuming, and susceptible to operator error. In particular, it is difficult to consistently and reliably detect fine residual surface firing media below a certain particle diameter.

Accordingly, it would be desirable to provide an improved method for detecting defects, such as residual powder particles, on a surface or interface of a part.

SUMMARY

X-ray scans such as computed tomography (CT) scans are conventionally used in industry for detecting defects such as voids, cracks and inclusions, based on differences in X-ray absorption in these regions. In general, however, many surface or interface defects cannot be detected using this approach. For example, in the case of ceramic cores and the firing medium, the ceramic and the firing medium typically have similar X-ray absorption coefficients which can prevent surface defect detection solely on this basis. This difficulty can be amplified if the firing medium fuses to the ceramic part during the firing process. Nonetheless, the present invention is at least partly based on a realisation that data from an X-ray scan can be used for detecting surface or interface defects. For example, if a CAD (computer aided design) model of the part is available, in principle a comparison between the CAD model and the scan data could be used for detecting larger surface or interface defects (e.g. of a size scale equal to or greater than manufacturing tolerances), but it would still be difficult to detect smaller surface or interface defects using such a comparison.

Accordingly, in a first aspect the present invention provides a method of detecting defects on a surface or interface of a part, the method including:
  providing data from an X-ray scan of the part;
  processing the scan data to obtain an original 3D or 2D model of a surface or interface topology of the part; and
  filtering the original 3D or 2D model of the surface or interface topology to identify deviations from the expected surface or interface topology of the part;
  wherein the identified deviations may be produced by surface or interface defects on the part.

Advantageously, this method can be performed relatively quickly and does not rely on the availability of a CAD model of the part. Further, it can be used to detect surface or interface contaminants and surface or interface imperfections which are smaller in size than the manufacturing and geometric tolerance of the process used to form the part.

The method is typically computer-implemented. Accordingly, further aspects of the present invention provide: a computer program comprising code which, when the code is executed on a computer, causes the computer to perform the method of the first aspect; a computer readable medium storing a computer program comprising code which, when the code is executed on a computer, causes the computer to perform the method of any of the first aspect; and a data processing system comprising one or more processors adapted to perform the method of any of the first aspect. For example, a data processing system can be provided for detecting defects on a surface or interface of a part, the system including: one or more processors configured to: process data from an X-ray scan of the part to obtain an original 3D or 2D model of a surface or interface topology of the part; and filter the original 3D or 2D model of the surface or interface topology to identify deviations from the expected surface or interface topology of the part; wherein the identified deviations may be produced by surface or interface defects on the part. The system thus corresponds to the method of the first aspect. The system may further include: a computer-readable medium operatively connected to the processors, the medium storing the scan data. The system may further include: a display device for displaying the identified deviations on the surface or interface topology of the part.

Optional features of the invention will now be set out. These are applicable singly or in any combination with any aspect of the invention.

Conveniently, the X-ray scan can be an X-ray computed tomography (CT) scan.

Conveniently, the filtering can be performed by: smoothing the original 3D or 2D model of the surface or interface topology and subtracting the smoothed 3D or 2D model from the original 3D or 2D model topology to identify the deviations from the expected surface or interface topology of the part.

However, another option for performing the filtering is to: calculate curvature values across the original 3D or 2D model of the surface or interface topology and compare the calculated curvature values and with a threshold value to identify the deviations from the expected surface or interface topology of the part. For example, in the context of a 3D model, the calculated curvature values can be Gaussian curvature values. Advantageously, the Gaussian curvature of a desired geometrical feature such as an edge of the part will be zero or very small, while the Gaussian curvature produced by a surface or interface particle will be significantly greater. In this way it is possible to distinguish between desired geometrical features and small surface or interface imperfections. Another option for 3D models, however, is for the calculated curvature values to be plural (e.g. two) curvature values in different (e.g. orthogonal) directions at any given position, each of the calculated curvature values being compared with a threshold value (which can be different for the different directions).

The method may further include: using the scan data to differentiate between those identified deviations which have the same X-ray absorption as the rest of the part, and those identified deviations which have different X-ray absorptions to the rest of the part, the identified deviations having different X-ray absorptions being more likely to be produced by surface or interface defects on the part. Thus if the surface or interface defect is in the form of e.g. a contamination due to a material with a different X-ray absorption property to that of the material of the part, then difference in X-ray absorptions can be used to further filter the results and improve detection accuracy. In particular it is possible to enhance the quality of the detection by using the difference in material property to isolate the surface or interface defect and separate it from noise. Having said that, in the context of ceramic cores for investment casting and firing medium, the ceramic of the core and the firing medium may have similar X-ray absorption coefficients, which makes impossible to use the scan result to separate the two. This is amplified by the fact that the firing media and some components of the ceramic parts may fuse during the heating process. Thus, another option is to use another analytical technique, such as spectroscopy, to differentiate between those identified deviations which have a same material property (e.g. a spectroscopic characteristic) as the rest of the part, and those identified deviations which have a different material property to the rest of the part, the identified deviations having the different material property being more likely to be produced by surface or interface defects on the part.

The X-ray scan may be a multi-energy X-ray scan. Multi-energy scan data can be used to enhance the ability to differentiate between material properties based on different absorption coefficients.

The part may be an investment casting ceramic mould component. For example, it may be a ceramic core for locating within an investment casting ceramic shell.

However, the method is not limited to ceramic mould components. It can be applied, for example, to detect surface or interface defects on other components. In particular, the part may be a component of a gas turbine engine, e.g. an investment cast component such as a turbine blade.

The method may further include performing an X-ray scan of the part to provide the scan data.

The method may further include removing the detected surface or interface defects from the part.

The term "computer readable medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a computer readable medium. One or more processors may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

BRIEF DESCRIPTION OF THE DRAWINGS

Embodiments of the invention will now be described by way of example with reference to the accompanying drawings in which:

FIGS. 4A, 4B, and 4C illustrate conceptually an approach for identifying surface imperfections by smoothing a surface topology, and shows a small region of the original surface topology with a bump on the surface which represents a protrusion or a defect, FIG. 4B shows the same small region after smoothing to remove the bump and leave a smooth surface, and FIG. 4C shows the isolated bump resulting from the subtraction of FIG. 4B from FIG. 4A.

DETAILED DESCRIPTION AND FURTHER OPTIONAL FEATURES

Figure 1:
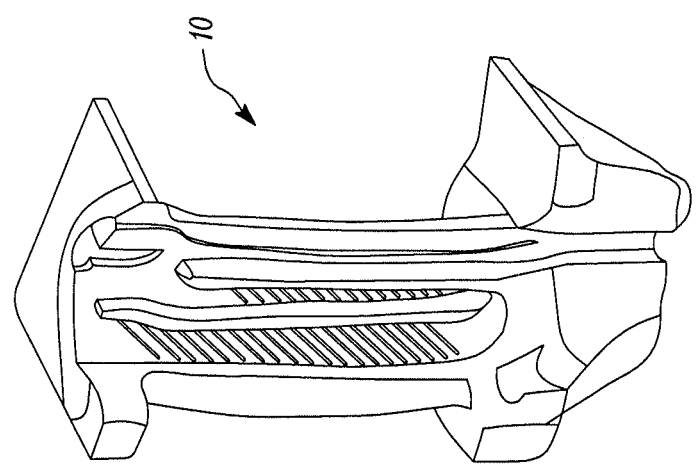
FIG. 1 shows a section through a high-pressure turbine blade having a complex internal cooling geometry.
Figure 2B:
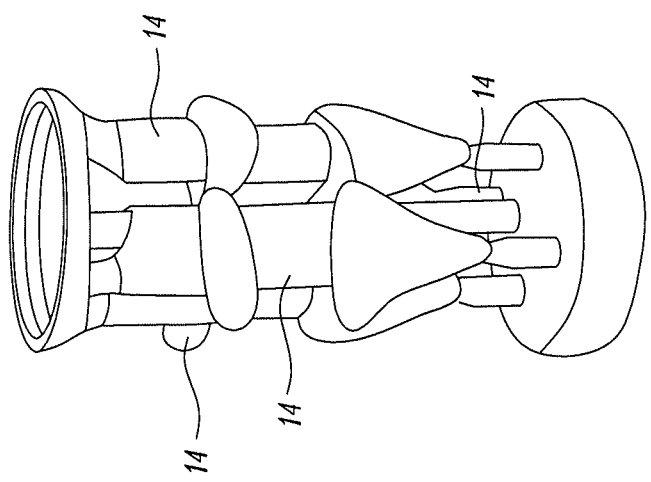
FIG. 2B shows four joined ceramic shells for respective high-pressure turbine blades ready to go to casting and with the ceramic cores already inside each shell.
Figure 2A:
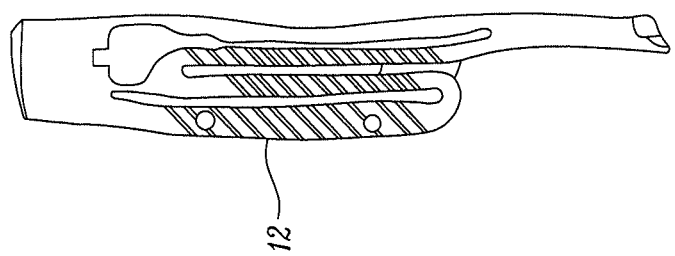
FIG. 2A shows a ceramic core that provides the complex internal cooling geometry of a high-pressure turbine blade.
Figure 3:
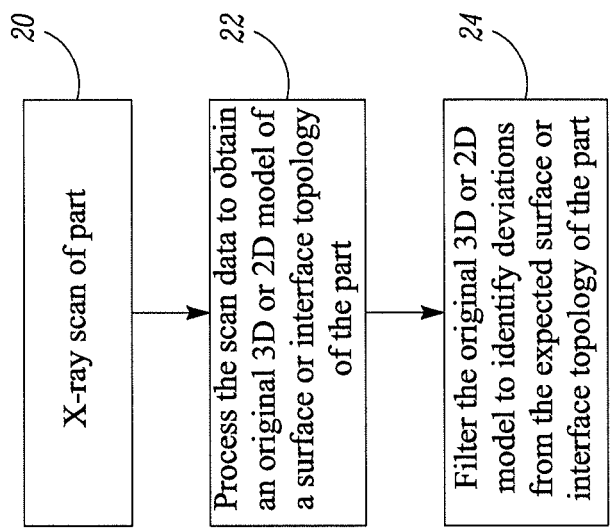
FIG. 3 shows a schematic flowchart for the method of the present invention.

X-ray scan data, and particularly 3D (three dimensional) or 2D (two dimensional) data from X-ray CT scans, are widely used to detect internal defects and for part comparison with CAD, or with other part models. However, conventionally such data are used for internal defect detection. In contrast, the present invention processes scan data to obtain an original 3D or 2D model of a surface topology of the part, and uses this for detection of surface defects. In particular 3D or 2D feature descriptor algorithms can be used to detect geometric features of surface topologies and filter them based on specific parameters. FIG. 3 shows a schematic flowchart for the method of the present invention.

Various software packages known to the skilled person can be used to obtain the original 3D or 2D model of a surface topology of a part by processing 22 X-ray scan data of the part following an X-ray scan of the part 20. One such package, for example, is the software VGStudio MAX™ from Volume Graphics GmbH.

The next stage is to filter 24 the surface topology to capture deviations. This filtering can be performed in various ways.

One approach is to remove surface imperfections by smoothing the overall surface. The smoothed surface topology can then be subtracted from the original surface topology to identify deviations which may be produced by surface defects on the part.

Typically, a software smoothing parameter is set manually to control the smoothing algorithm. This parameter, which usually takes a low numerical value, is conventionally used by software packages to remove the noise of sharp artificial peaks created due to imperfections in X-ray scan measurement or in the reconstruction algorithm that assembles the individual X-Ray images to form a 3D or 2D model. However, in the present case it is used to smooth away surface imperfections detected by the scan. In particular, the value of the smoothing parameters can be adjusted such that it smooths away the surface imperfections but leave the noise artefacts.

The procedure in illustrated conceptually in FIGS. 4A, 4B, and 4C which FIG. 4A shows a small region 30 of the original surface topology with a bump 32 on the surface which represents a protrusion or a defect, FIG. 4B shows the same small region 30 after smoothing to remove the bump and leave a smooth surface 34, and FIG. 4C shows the isolated bump 36 resulting from the subtraction of FIG. 4B from FIG. 4A.

Although described in terms of separate smoothing and subtraction stages, in practice the procedure can be mathematically simplified to a single stage based on known 3D or 2D feature descriptor algorithms.

A possible drawback of the above smoothing approach is that the smoothing parameter can be set at a level that smooths away actual edges or corners of the model. Accordingly a different filtering approach can be adopted based on curvature analysis. In this approach, conveniently the original surface topology is in the form of a point cloud. The value of the surface curvature for each point in the point cloud can then be calculated by creation of a virtual local surface based on n (where n is a natural number) neighbouring surface points. Advantageously, this does not require the entire surface to be recreated.

Abrupt changes in curvature created by surface imperfections can be used to detect external defects. In the context of a 3D model, this approach has an added advantage if the Gaussian curvature is used as the measure of curvature. This is because the value of the Gaussian curvature of edge-like actual geometrical features will be zero or very small, whereas the Gaussian curvature for a particle on the surface will be significantly larger. Thus suitably thresholding the calculated curvature values can be used to identify surface defect deviations, and to distinguish from desired geometrical features. Again the procedure can be based on known 3D feature descriptor algorithms.

However, another option for use with 3D models is to calculate curvatures in different, e.g. orthogonal, directions, and threshold separately in those directions. This can help in differentiating between desired geometrical features and imperfections of similar size.

Subsequently, if the surface defect is in the form of a contamination due to a material with different X-ray absorption property than that of the part, then the difference in X-ray absorption of the different materials can be used to further filter the results and improve the detection accuracy. Another option, however, is to use a different analytical technique, such as spectroscopy, to differentiate between different materials. Either way, such differentiation between different materials can be performed before or after the identification of deviations by the filtering of the original 3D or 2D model of the surface topology.

Multi-energy X-ray scan data can also be used to enhance the ability to differentiate between material properties, and thereby further improve the surface defect detection capability.

Particularly if the scan data is only used to obtain a 2D model of the surface topology, then CT may be unnecessary and a simple X-ray image can be used.

The procedure for detecting defects on a surface of a part described above is fast, accurate, reliable and automatable (e.g. computer implemented). Further it has the potential to identify defects of a smaller size than can be reliably detected by human microscope inspection. The procedure also provides information on part geometry which can be used in further processing. The procedure can be performed simultaneously with internal defect detection using the scan data.

The procedure has particular utility for detecting residual firing medium particles on the surface of ceramic cores for investment casting. These residual particles can then be removed before the cores are used. However, the procedure can be used to inspect any part for which scan data is available. For example, a turbine blade can be examined for pits or craters on the surface caused by erosion or collision with a foreign object.

Moreover, the procedure is not limited to a particular technical field, but can be used to inspect a multitude of products at manufacture or in-service. For example manufacturing process, such as coating processes, additive layer manufacture, forging, injection moulding, welding etc. can all create undesirable features, such as flash and die lines, which are amenable to detection using the procedure. Similarly, surface processes such as oxidation can create surface features during the life of a product that may require detection and periodic in-service reassessment.

Although described above in the context of surface defect detection, the present invention is also applicable to interface defect detection. For example, the defect can be a particle trapped between the core and a layer of coating, or a particle sandwiched between two subcomponents of a part. In the context of composite material parts, a small delamination defect can be extremely difficult to identify via CT due to the absence of or negligible size of an air pocket, and the surrounding material having a similar X-ray absorption property to air. However, the filtering approach of the present invention can be used to identify regions were such defects can occur by obtaining and filtering models of the interface topology of individual reinforcement fibres. This approach works because the surrounding matrix has a different X-ray absorption coefficient to the fibres.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting.

The invention claimed is:

1. A method of detecting defects on a surface of a part, the method including:
   providing data from an X-ray scan of the part;
   processing the scan data to obtain an original 3D or 2D model of a surface topology of the part;
   filtering the original 3D or 2D model of the surface topology to identify deviations from an expected surface topology of the part, the filtering being performed by calculating curvature values in different directions across the original 3D or 2D model of the surface topology and separately comparing the calculated curvature value for each different direction with a corresponding threshold value for that direction to identify the deviations from the expected surface topology of the part; and
   using the scan data to differentiate between (i) those identified deviations that have a same X-ray absorption as the rest of the part and (ii) those identified deviations that have different X-ray absorptions than the rest of the part, those identified deviations having different X-ray absorptions being more likely to be produced by surface defects on the part,
   wherein the surface defects that produce those identified deviations having different X-ray absorptions are a contaminant material that is different from a material forming the rest of the part.

2. The method according to claim 1, wherein the original model is a 3D model, and the calculated curvature values are Gaussian curvature values.

3. The method according to claim 1, wherein the part is an investment casting ceramic mould component.

4. The method according to claim 1, wherein the part is a component of a gas turbine engine.

5. The method according to claim 1, wherein the X-ray scan is an X-ray computed tomography (CT) scan.

6. The method according to claim 1, further including performing an X-ray scan of the part to provide the scan data.

7. The method according to claim 1, further including removing the detected surface defects from the part.

8. The method according to claim 1, wherein the part is selected from the group comprising an investment casting ceramic mould component and a component of a gas turbine engine.

9. A method of detecting defects on a surface of a part, the method including:
   providing data from an X-ray scan of the part;
   processing the scan data to obtain an original 3D or 2D model of a surface topology of the part; and
   filtering the original 3D or 2D model of the surface topology to identify deviations from an expected surface topology of the part, the filtering being performed by calculating curvature values in different directions across the original 3D or 2D model of the surface topology and separately comparing the calculated curvature value for each different direction with a corresponding threshold value for that direction to identify the deviations from the expected surface topology of the part; and
   using the scan data to differentiate between (i) those identified deviations that have a same X-ray absorption as the rest of the part and (ii) those identified deviations that have different X-ray absorptions than the rest of the part, those identified deviations having different X-ray absorptions being more likely to be produced by surface defects on the part,
   wherein the surface defects that produce those identified deviations having different X-ray absorptions are a contaminant material that is different from a material forming the rest of the part, and
   wherein the X-ray scan is a multi-energy X-ray scan.

10. The method according to claim 9, wherein the original model is a 3D model, and the calculated curvature values are Gaussian curvature values.

11. The method according to claim 9, wherein the X-ray scan is an X-ray computed tomography (CT) scan.

12. The method according to claim 9, further including performing an X-ray scan of the part to provide the scan data.

13. The method according to claim 9, further including removing the detected surface defects from the part.

14. A non-transitory computer-readable medium storing a computer program comprising code which, when the code is executed on a computer, causes the computer to perform a method of detecting defects on a surface of a part, the method including:
   providing data from an X-ray scan of the part;
   processing the scan data to obtain an original 3D or 2D model of a surface topology of the part; and
   filtering the original 3D or 2D model of the surface topology to identify deviations from an expected surface topology of the part, the filtering being performed by calculating curvature values in different directions across the original 3D or 2D model of the surface topology and separately comparing the calculated curvature value for each different direction with a corresponding threshold value for that direction to identify the deviations from the expected surface topology of the part; and
   using the scan data to differentiate between (i) those identified deviations that have a same X-ray absorption as the rest of the part and (ii) those identified deviations that have different X-ray absorptions than the rest of the part, those identified deviations having different X-ray absorptions being more likely to be produced by surface defects on the part,
   wherein the surface defects that produce those identified deviations having different X-ray absorptions are a contaminant material that is different from a material forming the rest of the part, and
   wherein the X-ray scan is a multi-energy X-ray scan.

* * * * *